Figure 1:
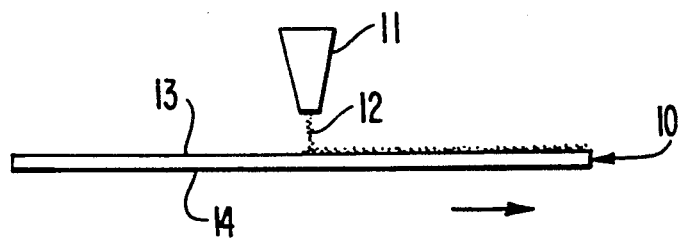

United States Patent [19]

Elliott et al.

[11] Patent Number: 5,087,311
[45] Date of Patent: * Feb. 11, 1992

[54] PROCESS OF LAMINATING FABRIC TO A CONCAVE SUBSTRATE

[75] Inventors: George M. Elliott, Alpharetta; Fred A. Simmons, Atlanta, both of Ga.

[73] Assignee: Astechnologies, Inc., Roswell, Ga.

[*] Notice: The portion of the term of this patent subsequent to Nov. 22, 2005 has been disclaimed.

[21] Appl. No.: 230,480

[22] Filed: Aug. 10, 1988

Related U.S. Application Data

[63] Continuation of Ser. No. 905,187, Sep. 10, 1986, abandoned.

[51] Int. Cl.$^5$ .............................................. B32B 31/06
[52] U.S. Cl. ..................................... 156/212; 156/245; 156/306.6; 156/313; 264/82
[58] Field of Search .............. 425/351, 388, 407, 411, 425/416, 420, 422, 446, 504; 156/245, 212, 213, 285, 306.6, 313; 264/82, 101, 102

[56] References Cited

U.S. PATENT DOCUMENTS

| | | | |
|---|---|---|---|
| 3,265,530 | 8/1966 | Marzocchi et al. | |
| 3,280,237 | 10/1966 | Corbin et al. | |
| 3,654,019 | 4/1972 | Cusick | 156/285 |
| 3,891,738 | 6/1975 | Shen | 264/101 |
| 3,935,358 | 1/1976 | Wyeth et al. | 156/245 |
| 3,992,238 | 11/1976 | Johns | 156/93 |
| 4,009,310 | 2/1977 | Scobbo | 150/322 |
| 4,052,241 | 10/1977 | Walter | 264/278 |
| 4,097,629 | 6/1978 | Schneider | 156/311 |
| 4,119,749 | 10/1978 | Roth et al. | 428/71 |
| 4,124,421 | 11/1978 | Fuji | 264/101 |
| 4,131,664 | 12/1978 | Flowers et al. | 156/285 |
| 4,260,575 | 4/1981 | Theu et al. | 264/321 |
| 4,313,776 | 2/1982 | Urai et al. | 156/220 |
| 4,323,410 | 4/1982 | Urai | 156/228 |
| 4,327,049 | 4/1982 | Miller | 264/257 |
| 4,379,101 | 4/1983 | Smith | 264/109 |
| 4,469,655 | 9/1984 | Kiss | 264/324 |
| 4,517,236 | 5/1985 | Meeker et al. | 156/62.4 |
| 4,692,199 | 9/1987 | Kozlowski et al. | 156/285 |
| 4,718,153 | 1/1988 | Armitage et al. | 156/72 |
| 4,786,351 | 11/1988 | Elliott et al. | 156/245 |

Primary Examiner—Michael W. Ball
Assistant Examiner—Jeff H. Aftergut
Attorney, Agent, or Firm—Sutherland, Asbill & Brennan

[57] ABSTRACT

A piece of fabric, preferably foam-backed, is laminated to a concave, rigid substrate, such as a fiberglass shell for an automobile headliner, by:

a) coating the back of the fabric with a heat activable adhesive, e.g., a powdered polyamide;

b) placing the adhesive side of the fabric against the concave side of the substrate;

c) preheating a perforated male die having a complementary shape to that of the substrate;

d) pressing the die against the fabric;

e) ejecting a shot of superheated vapor, preferably steam, through the fabric, thereby activating the adhesive;

f) cooling the adhesive until it sets; and g) releasing the laminated article from the die.

The treatment with the superheated vapor permanently stretches the fabric in the concavities, preventing delamination after the article is released from the die.

27 Claims, 3 Drawing Sheets

PROCESS OF LAMINATING FABRIC TO A CONCAVE SUBSTRATE

This application is a continuation of application Ser. No. 06/905,187, filed Sept. 10, 1986 now abandoned.

This invention relates to a process of laminating fabric to a concave, rigid substrate. In particular, it is directed to a method of lamination using a thermally activated adhesive that results in better bonding in the concave areas.

There are a variety of circumstances in which it is desired to laminate a fabric to a rigid, concave substrate. One example is automobile headliners. These are often formed of concave shells of fiberglass, corrugated paper compositions, or rigid foams, such as foams made of polystyrene, to which a fabric having a soft foam backing is laminated. See, for example, U.S. Pat. Nos. 4,119,749 to Roth et al., No. 4,077,821 to Doerfling, and No. 3,252,732 to Squier. A frequent problem with such articles is that delamination occurs in the concave areas. When the lamination is performed, the fabric is forced into the concavities by a male die or mold, creating some tension in the fabric. The fabric then pulls against the lamination adhesive after the die is removed. Often the foam will then separate from the substrate. This is called bridging. It can occur immediately upon release from the mold or it can occur days, weeks, or months later. It detracts significantly from the appearance of the product. To overcome the problem, it is common practice to use high stretch fabrics, which exert less of a pull on the adhesive but which generally are more expensive than less elasticized fabrics. Even then delamination sometimes occurs.

The process of this invention laminates fabric to a substrate with little or no tension resulting in the fabric and, therefore, with a substantially reduced likelihood of bridging occurring, even when a non-elasticized fabric is used. The process comprises the following steps:

(a) coating the back of the fabric with a layer of heat activatable adhesive;

(b) placing the fabric against the concave side of the substrate, with the adhesive next to the substrate;

(c) preheating a male die having a complementary shape to that of the concave substrate, said die being perforated across substantially its entire contact surface;

(d) pressing the preheated die against the face of the fabric so as to push the fabric into the concave areas of the substrate;

(e) ejecting a shot of superheated vapor through the perforations in the male die at a pressure sufficient to drive the vapor through the fabric, thereby activating the adhesive and relaxing those areas of the fabric that are under tension;

(f) cooling the adhesive while maintaining the die pressure against the fabric, until the adhesive has set, thereby laminating the fabric to the substrate; and (g) disengaging the die and the resultant laminated composition.

Even if not elasticized, the fabric is stretched in the areas where the male die pushes it into the concavities. But by use of the superheated vapor, preferably steam, the resulting tension in the fabric is then relieved, without shrinking the fabric back to its original shape. Thus the fabric takes on a new shape—that of the concavity—and does not pull against the adhesive bonds later. This process is especially useful in providing complete and long-lasting lamination where a concavity is formed by the meeting of three planes, e.g., as in each of the four corners of an automobile headliner, as well as in the headliner recesses for sun visors.

By preheating the male die and using superheated vapor to activate the adhesive, vapor condensation on the fabric can be avoided. This reduces or eliminates spotting of the decorative face of the fabric. Precisely how hot the die needs to be depends upon the activation temperature of the adhesive. Preferably, the die temperature will be high enough to warm the adhesive to near its activation temperature. For most adhesives it will be preferred that the surface temperature of the die be below the adhesive's activation temperature but within about 30 Fahrenheit degrees thereof, e.g., about 20 to 30 Fahrenheit degrees below the activation temperature of the adhesive. A die temperature of about 180° to 200° F. often is preferred. The preferred means of preheating the die is by use of electrical resistance heaters.

As stated above, the preferred superheated vapor to use is steam. Superheated steam is steam that exists at a temperature greater than the saturation temperature corresponding to its pressure. The temperature, pressure, flow rate, and duration of ejection of the steam into the fabric are to a certain extent interrelated. The pressure should be high enough to drive the vapor through the fabric. The combination of pressure, temperature, and time should be such that the adhesive will be melted across substantially the entire contact surface of the substrate and the tension in the fabric in the concave areas will be relaxed. Also, it is preferred that the conditions be such that the foam backing in these areas, if such is used, reach a high enough temperature that it will soften slightly, allowing it to conform to the shape of the substrate without tension. Usually the steam will have to have a temperature in the range of about 400° to 600° F. and a pressure of about 75 to 85 pounds per square inch gauge (psig). (This is as measured before the steam contacts the die surface.)

The perforations in the die should be relatively small, e.g., having a diameter in the range of about 0.030 to 0.080 inch. There should be enough of the perforations, and they should be spaced closely enough together, to ensure relatively uniform heating of the adhesive. The smaller the perforations, the closer together they should be. Generally, the perforations should be spaced not more than about 3/4 inch apart.

Suitable apparatus for practicing the process of the present invention are disclosed in U.S. patent applications No. 831,514, filed Dec. 31, 1985 ("Process and Apparatus for Simultaneously Shaping Foam and Laminating Fabric Thereto") and U.S. Pat. No. 870,971, filed June 5, 1986 ("Apparatus and Process for Shaping and Covering Cushion Foam"), which are incorporated herein by reference.

Fabrics that can be used in the process of the present invention include both knits and woven fabrics. The fabric needs to be gas-permeable, however, so as to allow the superheated vapor to pass through it. Circular jersey knits, raschel knits, and tricot warp knits can be used. Suitable woven fabrics include twills, flat wovens, and velours. The fibers of which the fabrics are made may be polyester, nylon, rayon, wool, cotton, or elastomeric, i.e. "stretch", fibers—alone or in various blends. Preferably the fabric will be stretchable by a factor of at least about 5 percent, e.g., about 5 to 20 percent. This refers to the amount the fabric can be stretched at room temperature, without being permanently distorted.

The fabric may be backed or plain. Foam-backed fabrics often are preferred in such products. The foam normally is an open cell, thermoplastic, cushion foam, e.g., a polyurethane or polyolefin foam. Polyether-based polyurethanes and polyester-based polyurethanes can both be used. For automobile headliners the polyether-based polyurethanes hold up better, especially in hot climates, and are much preferred. Polyethylene is the most common form of polyolefin foam used as fabric backing. Polyester-based polyurethane foams often have melting points in the range of about 300° to 325° F. Polyetherbased polyurethanes melt higher, usually in the range of about 375° to 450° F. Polyolefin foams usually have melt points somewhere in the range of about 325° to 400° F. Preferably the foam will have a melting point higher than the activation temperature of the adhesive.

The only limitation on foam thickness is that it must be thin enough that the superheated vapor can penetrate the foam adequately to activate the adhesive next to the substrate. Usually the foam will have a thickness of about one inch or less, often no more than about 3/16 inch.

Foam-backed fabrics are well known in the art and can be manufactured by a number of different methods. Perhaps the most common method in use today is flame lamination. This entails passing a sheet of foam over an open flame to cause the sheet to become tacky on the bottom surface, and then pressing the tacky surface against the back of the fabric, using nip rollers.

The adhesive used to laminate the fabric to the substrate is a fabric adhesive which is activated at an elevated temperature, e.g., about 140° F. or above. Adhesives that are substantially solid at room temperature are preferred. It also is preferred that the adhesive be thermoplastic, i.e., can be remelted after once being set. The activation temperature of the adhesive should be low enough that the fabric will not be damaged. (Some fabrics can withstand temperatures as high as about 350° F., for short periods of time, without significant damage.) Different adhesives may be preferred for different fabrics. Most often, however, the adhesive will have an activation temperature within the range of about 190° to 270° F. Use of a thermoplastic adhesive that melts in the range of about 210° to 250° F. is most preferred. Thermoplastic polyamide adhesives are quite effective.

A normally solid adhesive can be applied to the fabric in particulate form, as a film, or as a web. Preferably, it will be applied to the fabric in particulate form, i.e., it will be sprinkled on the fabric. This method of application permits greater uniformity of the adhesive coating than, for example, spray application of a liquid adhesive permits. The difference can be important in obtaining a smooth, even appearance in the final product. A commonly used prior art method of laminating a fabric to an automobile headliner shell involves the spraying of liquid adhesive on the rigid shell, following which the shell is sent through an oven to make the adhesive tacky. The shell then is placed in a female mold and fabric is laid over it. A male die is pressed against the fabric, but without the use of a superheated vapor. The die either is unheated or is heated by conductive heat. In addition to the bridging problem mentioned above, this often results in uneven application of the adhesive. If the adhesive layer is excessively thick in an area where there are imperfections, such as grooves or indentations, in the surface of the substrate, the imperfections will show through the fabric in the finished product. By using a powdered adhesive, e.g., having a particle size of about 100 to 400 microns, we are able to apply the coating with an accuracy of about ±0.1 gram/square foot, which makes for a smoother finish in the final product.

Another advantage in using a particulate adhesive is that it results in less waste. Spray application can result in a loss of as much as 30 percent of a liquid adhesive, due to spray falling beyond the edges of the substrate and to run-off. Spraying also releases more fumes than the sprinkling of powdered adhesive does. Some of these fumes can be unhealthy for humans or otherwise dangerous. Relatively high melting adhesives that can be used in the present process sometimes could not be used in prior art laminations due to the risk of damage to the decorative facing fabric. Conductive heat having a temperature high enough to melt a normally solid adhesive underneath a foam-backed fabric often must be so hot it degrades the appearance or strength of the fabric. In the present process, however, small diameter jets of superheated vapor, hot enough to melt the underlying adhesive, may pass through the fabric without damaging it. Indeed, if, in the present process, the temperature of the male die is kept below the melt point of the adhesive, then the surface temperature of the fabric generally will also remain lower than the adhesive melt point. The thicker the fabric, the greater the temperature drop from adhesive to fabric face. Lamination using conductive heat produces the opposite result. The face of the die normally has to be heated to above the adhesive's activation point, because the fabric acts as an insulator. Thus the fabric is heated to at least as high a temperature as the adhesive, and usually higher. The present process permits the use of the more desirable hot melt adhesives, which often cannot be used in conductive heat lamination.

The substrate used can be any rigid material that will not melt or otherwise degrade when subjected to the action of the adhesive and vapor and the heat of the process. E.g., it can be made of metal, wood products, plastic, fiberglass, or rigid foam. It is preferred that the substrate be gaspermeable, so as to allow cooling air to be pulled through it after the fabric has been stretched and the adhesive activated. The process is especially useful, for example, in laminating a foam-backed fabric to a contoured, compressed sheet of loose fibers bound together, e.g., glass fibers or textile waste (also known as "shoddy"). The binder used is preferably a thermoset resin, e.g., a phenolic resin, such a phenolformaldehyde condensation resin. Examples of such sheets, and methods of producing them, are disclosed in U.S. Pat. Nos. 4,337,049 to Miller, No. 4,385,955 to Doerfling et al., and No. 4,466,848 to Ogawa, and in a copending U.S. patent application Ser. No. 903,191, now abandoned, filed Sept. 3, 1986, by George M. Elliott, entitled "Process of Forming a Contoured Insulating Sheet."

In an alternative method of practicing the process of the present invention, rather than use a foam-backed fabric as a starting material, separate sheets of foam and fabric can be glued together simultaneously with the lamination of the foam to the concave substrate. In this three-ply lamination the fabric is placed over one side of the foam with a first layer of a thermally activated adhesive in between the fabric and the foam; then the exposed side of the foam is coated with a second layer of a thermally activated adhesive. Generally the same requirements apply for the adhesive used between the fabric and foam as for that used between the foam and the rigid substrate. It is preferred, however, that a higher activation temperature adhesive be used between the fabric and the foam. Advantageously, the difference in activation temperatures of the two adhesives will be in the range of about 20 to 50 Fahrenheit degrees. The fabric preferably will be somewhat elastic, e.g., having a stretch value of at least about ten percent. The layered composite of fabric, adhesive, and foam is placed against the concave side of the substrate, with the second layer of adhesive next to the substrate. The remainder of the process is the same, with the die temperature preferably being within about 30 Fahrenheit degrees of the activation temperature of the adhesive between the fabric and the foam.

For a fuller understanding of the process of the present invention, reference is made to the drawings that accompany this specification. FIGS. 1-7 schematically depict the preparation of a covered automobile headliner using the process of the present invention.

In FIG. 1 a sheet of foam-backed fabric 10 is conveyed under a hopper 11, from which a powdered thermoplastic adhesive 12 is uniformly sprinkled over the surface of the foam 13. The adhesive is applied at a rate of 18 grams per square meter. The adhesive is a polyamide having a melt point of approximately 220° F. Foam 13 is a sheet of open celled, polyether-based polyurethane, one-eighth inch thick. It is laminated to a decorative facing fabric 14, which is a woven blend of polyester and Lycra ® spandex.

Figure 2:
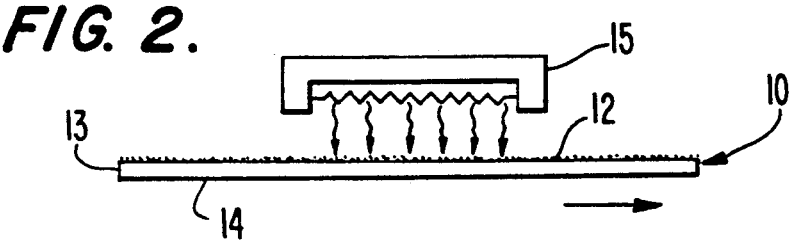

In FIG. 2 foam-backed fabric 10 is conveyed past a radiant heater 15, which heats the powdered adhesive 12 just until it becomes tacky enough to stick to the foam 13.

Figure 3:
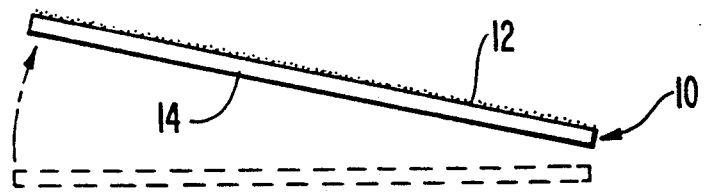

In FIG. 3 foam-backed fabric 10 is turned over so that the decorative facing fabric 14 is on the top.

Figure 4:
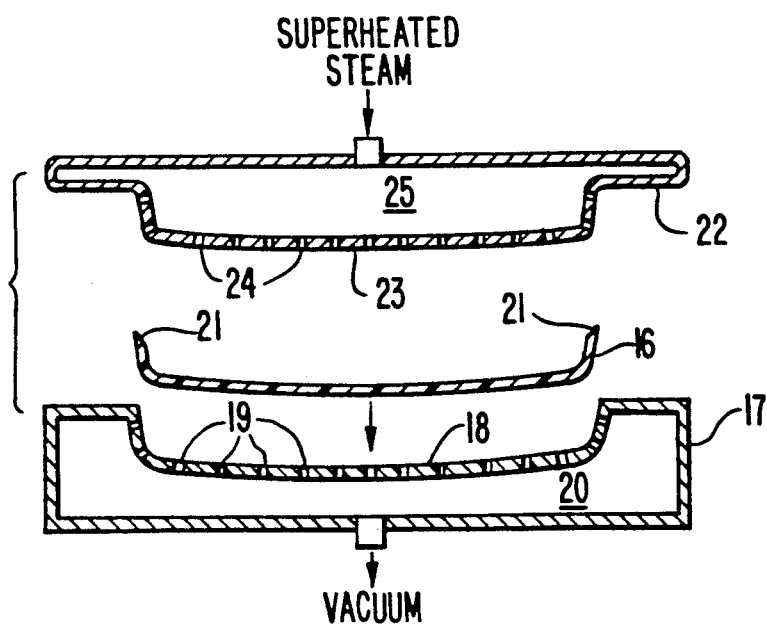

In FIG. 4 a rigid shell 16 for an automobile headliner is lowered into female die 17. The entire contact surface 18 of female die 17 is perforated with holes 19, which have a diameter of 0.040 inch and are spaced ½ inch apart. The enclosed cavity 20 behind female die surface 18 is connected to means (not shown) for pulling a vacuum. The concave shape of the contact surface 18 of female die 17 corresponds to that of headliner shell 16. Shell 16 is made of slightly compressed fiberglass, bound together with a thermoset phenolformaldehyde resin. The porous shell measures about 60 inches wide by about 110 inches long and is approximately 9/16 inch thick, except at the edges 21, where it narrows to a thickness of about ⅛ inch. Poised above female mold 17 and headliner shell 16 is male die 22. The entire contact surface 23 of die 22 also is perforated, by holes 24, which are the same in size and spacing as holes 19 in female die 17. The contour of male die 22 is complementary to that of female die 17. Behind contact surface 23 of die 22 is an enclosed chamber 25, which is in communication with a source (not shown) of superheated steam having a temperature of about 450° F. and a pressure of about 80 psig.

Figure 5:
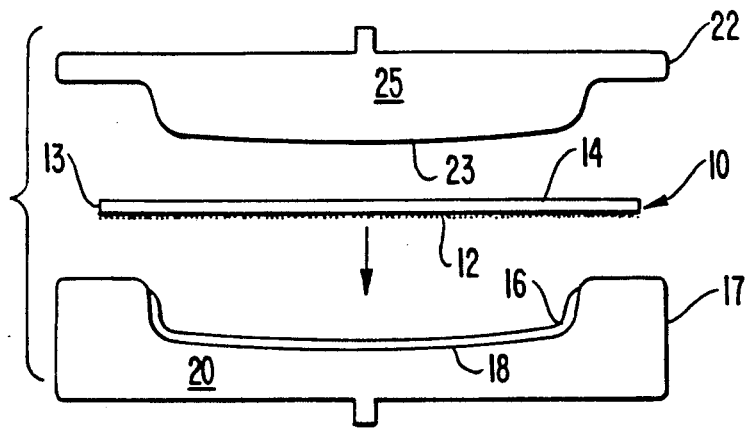

In FIG. 5 adhesive-coated fabric 10 (from FIG. 3) is laid on top of headliner shell 16. The exposed layer of adhesive 12 is thereby sandwiched between foam backing 13 and headliner shell 16. Both die contact surfaces 18 and 23 are preheated by electrical resistance heaters (not shown) to a temperature of approximately 200° F.

Figure 6:
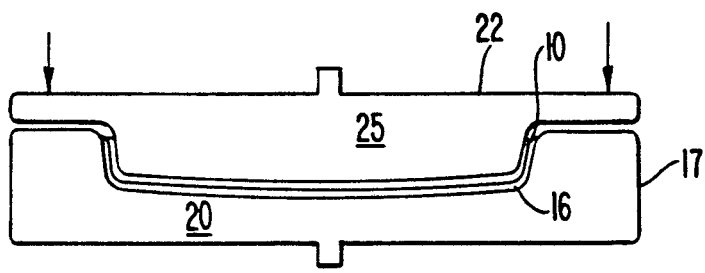
Figure 7:
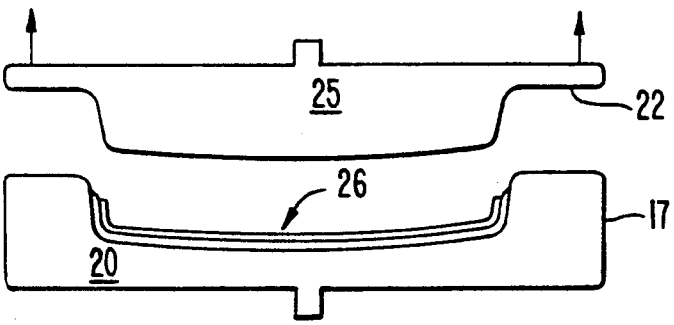

In FIG. 6 male die 22 is shown fully lowered into female die 17, thereby compressing foam-backed fabric 10 into tight engagement with concave headliner shell 16. When the dies are fully closed, the superheated steam is admitted to chamber 25, from whence it is ejected through the perforations 24 in male die 22. The steam ejection is continued for approximately 15 seconds. At about the 14th second a vacuum of approximately 1250 cubic feet per minute, at 7 inches of water, is pulled on female die 17 and is continued for about 6 seconds. As the vacuum is applied to female die 17, ambient air is pulled through foam-backed fabric 10 and headliner shell 16 through the gap around the peripheries of dies 17 and 22. The ejected steam heats the adhesive 12 to melting; the air purge helps cool and resolidify the adhesive. In only 20 seconds, lamination is complete; then, as shown in FIG. 7, male die 22 is raised, permitting the removal of the finished headliner 26 from female die 17. (A comparable prior art process would require a press time of approximately 45 to 60 seconds.).

Figure 8:
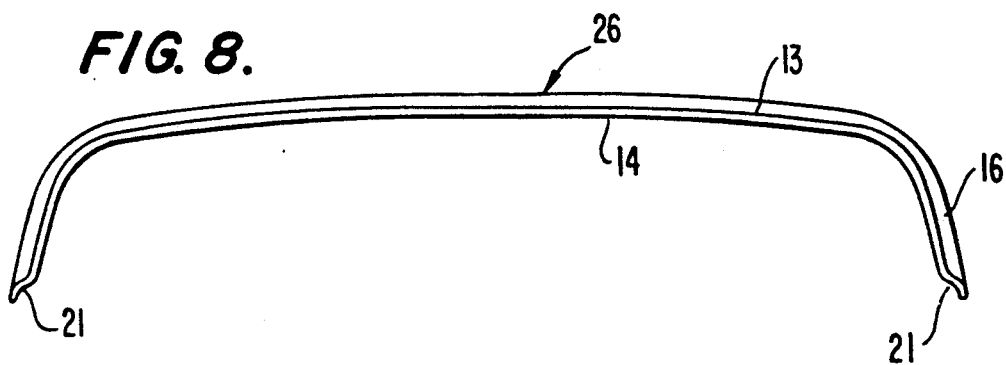

FIG. 8 shows an enlarged view of the finished headliner 26, turned over from the position it occupied in female die 17. This is the orientation the headliner will have in an automobile, with the decorative facing fabric 14 on the underside.

Figure 10:
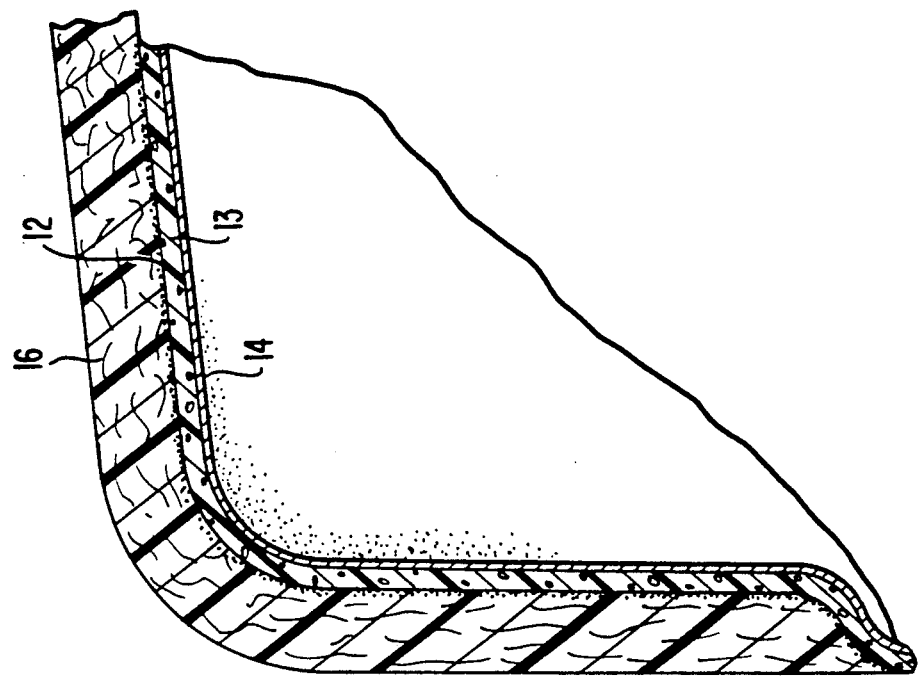
Figure 9:
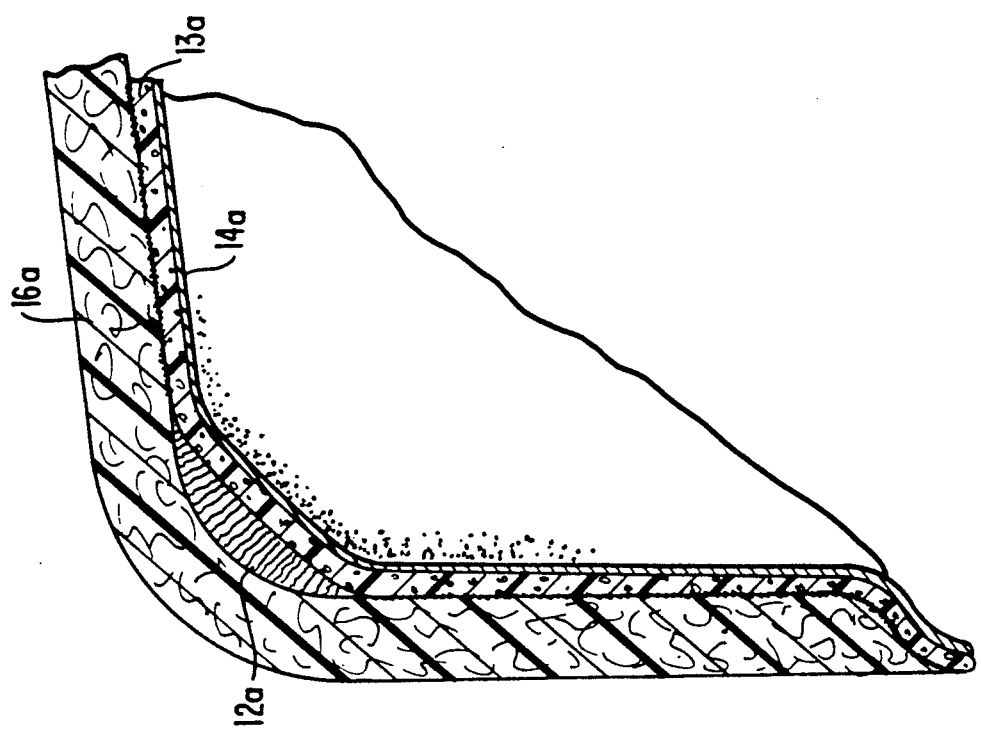

FIG. 10 is a life-size perspective view, in partial cross-section, of one of the four corners of the finished headliner shown in FIG. 8. Resilient foam backing 13 adheres tightly and uniformly to porous fiberglass shell 16, while decorative facing fabric 13 remains completely laminated to the foam. In contrast thereto, FIG. 9 depicts a corner of a prior art headliner formed of the same materials, but using conductive heat and a liquid adhesive, rather than superheated steam and powdered adhesive. As can be seen, after removal of the headliner from the mold, the adhesive 12a has given way and foam 13a is loose in the corner of shell 16a.

It is contemplated that the process depicted in FIGS. 1-8 can be performed in a semi-continuous manner using a roll (not shown) of foam-backed fabric 10, which would remain uncut until the pressing step (FIG. 6). Each side edge of the fabric might be held by a row of upstanding pins carried by a conveyor belt (not shown). In this manner the fabric can be held taut while it is pressed into the female die, so as to lessen the chance of wrinkling.

In making automobile headliners and the like, the process of the present invention allows the fabric to conform more closely to the contour of the substrate, even when the substrate has relatively deep concavities. This frees the manufacturer to use a broader array of designs than can be implemented with prior art processes.

We claim:

1. A process of laminating a piece of fabric to a rigid substrate having at least one concavity, wherein the fabric is steam-permeable, comprising the following steps:
   a) coating the back of the fabric with a layer of heat activatable adhesive;
   b) placing the fabric against the concave side of the substrate, with the adhesive next to the substrate;
   c) preheating a first die having a complementary shape to that of the substrate, said die being perforated across substantially its entire contact surface, provided that if the adhesive is a thermoplastic adhesive, then the temperature to which the contact surface of the die is heated is below the melting point of the adhesive;
   d) pressing the preheated die into the substrate so as to push the adhesive-coated fabric into a concavity of the substrate, thereby placing the fabric under tension in that area;

e) ejecting a shot of superheated steam through the perforations in the die at a pressure sufficient to drive the steam through the fabric, the temperature of the steam being high enough to activate the adhesive across substantially the entire contact surface and to relax those areas of the fabric that are under tension;

f) maintaining the die pressure against the substrate until the adhesive has set, thereby laminating the fabric to the substrate; and g) disengaging the die and withdrawing the resultant laminated composition.

2. The process of claim 1 wherein the adhesive is substantially solid at room temperature.

3. The process of claim 2 wherein the fabric has a backing of open cell cushion foam.

4. The process of claim 3 wherein, in step (d), the substrate rests in a second die having a shape corresponding to that of the first die, and the steam is at a temperature of about 400° to 600° F. and a pressure of about 75 to 85 pounds per square inch gauge, said temperature and said pressure being as measured before the steam contacts the first die surface.

5. The process of claim 4 wherein, in step (f), the adhesive is cooled by passing a cooling gas through the fabric.

6. The process of claim 5 wherein the cooling gas is air.

7. The process of claim 1 wherein the substrate is a contoured sheet of fibers bound together.

8. The process of claim 1 wherein the substrate is a contoured sheet of glass fibers glued together.

9. The process of claim 3 wherein the substrate is a gas-permeable, contoured sheet of glass fibers bound together.

10. The process of claim 6 wherein the substrate is a gas-permeable, contoured sheet of glass fibers bound together with a thermoset resin.

11. The process of claim 3 wherein the adhesive is thermoplastic and, in step (c), the first die is preheated to a temperature above room temperature but below the melting point of the adhesive.

12. The process of claim 10 wherein the adhesive is thermoplastic and, in step (c), the first die is preheated to a temperature below the melting point of the adhesive but within about 30 Fahrenheit degrees thereof.

13. The process of claim 11 wherein the adhesive used in step (a) is in particulate form and melts somewhere in the range of about 190° to 270° F. and, prior to performing step (b), the adhesive coating is heated until it becomes tacky and sticks to the foam backing.

14. The process of claim 12 wherein the adhesive used in step (a) is in particulate form and melts somewhere in the range of about 190° to 270° F. and, prior to performing step (b), the adhesive coating is heated until it becomes tacky and sticks to the foam backing.

15. The process of claim 6 wherein the second die is perforated across substantially its entire contact surface and, in step (f), the air is passed through the fabric by pulling a vacuum through the perforations in the second die.

16. The process of claim 14 wherein the second die is perforated across substantially its entire contact surface, and, in step (f), the air is passed through the fabric by pulling a vacuum through the perforations in the second die.

17. The process of claim 6 wherein the foam is composed of a polyurethane resin and the adhesive used in step (a) is a polyamide melting somewhere in the range of about 210° to 250° F.

18. The process of claim 16 wherein the foam is composed of a polyurethane resin and the adhesive used in step (a) is a polyamide melting somewhere in the range of about 210° to 250° F.

19. The process of claim 15 wherein the fabric is a foam-backed woven fabric having a stretch value of at least about 5 percent.

20. The process of claim 16 wherein the fabric is a foam-backed woven fabric having a stretch value of at least about 5 percent.

21. The process of claim 18 wherein the fabric is a foam-backed woven fabric having a stretch value of at least about 5 percent.

22. The process of claim 21 wherein the foam is a polyether-based polyurethane having a thickness of about 3/16 inch or less.

23. A process of laminating a steam-permeable fabric to a sheet of open cell, thermoplastic cushion foam, while simultaneously laminating the foam to a rigid substrate having at least one concavity, comprising the following steps:

a) placing the fabric over one side of the foam with a first layer of heat activatable adhesive in between the fabric and the foam, the adhesive having an activation temperature lower than the foam's melting point;

b) coating the side of the foam opposite the side on which the fabric has been placed with an exposed layer of a hot melt adhesive, the adhesive having a melting point lower than the foam's melting point, thereby obtaining a layered composite of the fabric, the foam, and the adhesive;

c) placing the layered composite of fabric, foam, and adhesive against the side of the substrate having at least one concavity, with the exposed layer of adhesive next to the substrate;

d) preheating a first die having a complementary shape to that of the substrate, said die being perforated across substantially its entire contact surface and being preheated to a temperature below the melting point of the hot melt adhesive;

e) pressing the preheated die into the substrate so as to compress the composite between the die and the substrate and push the composite into a concavity of the substrate, thereby placing the fabric under tension in that area;

f) ejecting a shot of superheated steam through the perforations in the die at a pressure sufficient to drive the steam through the fabric and the foam, the temperature of the steam being high enough to activate both layers of adhesive across substantially the entire contact surface and to relax those areas of the fabric that are under tension;

g) cooling both layers of adhesive, while maintaining the die pressure against the substrate, until the adhesive has set, thereby laminating the foam to the substrate and the fabric to the foam; and h) disengaging the die and withdrawing the resultant laminated composition.

24. A process of laminating a steam-permeable fabric to a sheet of open cell, thermoplastic cushion foam, while simultaneously laminating the foam to a steam-permeable, rigid substrate of glass fibers bound together, said substrate having at least one concavity therein, comprising the following steps:
- a) placing the fabric over one side of the foam with a first layer of a normally solid, thermoplastic adhesive in between the fabric and the foam, the adhesive having a melting point lower than that of the foam and somewhere in the range of about 190° to 270° F.;
- b) coating the side of the foam opposite the side on which the fabric has been placed with an exposed layer of a normally solid, thermoplastic adhesive having a melting point lower than that of the foam and somewhere in the range of about 190° to 270° F., thereby obtaining a layered composite of the fabric, the foam, and the adhesive;
- c) heating the exposed layer of adhesive until it becomes tacky and sticks to the foam;
- d) placing the layered composite of fabric, foam, and adhesive against the side of the rigid substrate having at least one concavity, with the exposed layer of adhesive next to said rigid substrate;
- e) preheating a first die having a complementary shape to that of the rigid substrate to a temperature above room temperature but lower than the melting points of the adhesives in the composite, said die being perforated across substantially its entire contact surface;
- f) pressing the preheated first die into the rigid substrate while said rigid substrate rests in a second die having a shape corresponding to that of the first die, so as the compress the composite between the first die and said rigid substrate and push the composite into a concavity of the substrate, thereby placing the fabric under tension in that concavity, said second die also being perforated across substantially its entire contact surface;
- g) ejecting a shot of superheated steam at a temperature of about 400° to 600° F. and a pressure of about 75 to 85 pounds per square inch gauge through the perforations in the first die for a time sufficient to melt both layers of adhesive across substantially the entire contact surface and to relax those areas of the fabric that are under tension, said temperature and said pressure being as measured before the steam contacts the first die surface;
- h) pulling ambient air through the perforations in the second die, while maintaining the die pressure against the substrate, until both layers of adhesive have resolidified, thereby laminating the foam to the rigid substrate and the fabric to the foam; and
- i) disengaging the dies and withdrawing the resultant laminated composition.

25. The process of claim 24 wherein the fibers are randomly oriented in the rigid substrate of glass fibers bound together, the binder holding the fibers together is a phenolic resin, the foam is a polyurethane foam, and the first layer of adhesive has a melt point about 20 to 50 Fahrenheit degrees higher than that of the exposed layer of adhesive.

26. The process of claim 25 wherein the adhesive in both layers consists essentially of a phenol-formaldehyde resin.

27. The process of claim 26 wherein the fabric has a stretch value of at least about 10 percent.

* * * * *